United States Patent [19]

Nagle et al.

[11] Patent Number: 5,335,190

[45] Date of Patent: Aug. 2, 1994

[54] INCLINOMETER WHICH IS RESCALABLE THROUGH THE USE OF MULTIPLE ANGLES

[75] Inventors: Robert E. Nagle, Mt. View; Andrew G. Butler, Palo Alto, both of Calif.

[73] Assignee: Wedge Innovations Incorporated, Oklahoma City, Okla.

[21] Appl. No.: 920,395

[22] Filed: Jul. 27, 1992

Related U.S. Application Data

[63] Continuation of Ser. No. 422,515, Oct. 17, 1989, abandoned, which is a continuation-in-part of Ser. No. 65,286, Jun. 22, 1987, Pat. No. 4,912,662.

[51] Int. Cl.$^5$ .............................................. G01C 9/06
[52] U.S. Cl. ................... 364/571.01; 73/1 E; 33/366; 364/559
[58] Field of Search ............... 364/559, 550, 551.01, 364/571.01, 571.02, 571.04; 73/1 E; 33/366

[56] References Cited

U.S. PATENT DOCUMENTS

| | | |
|---|---|---|
| 1,928,971 | 10/1933 | Dillon et al. . |
| 2,322,681 | 6/1943 | Zenor . |
| 2,532,883 | 12/1950 | Bennett et al. . |
| 2,592,941 | 4/1952 | Moore . |
| 2,633,028 | 3/1953 | Fillebrown . |
| 2,711,490 | 6/1955 | Gynt et al. . |
| 2,711,590 | 6/1955 | Wilcox . |
| 2,825,978 | 3/1958 | Davis . |
| 2,936,411 | 5/1960 | Doty . |
| 3,009,255 | 11/1961 | Robillard . |
| 3,059,343 | 10/1962 | Kermore . |
| 3,233,235 | 2/1966 | Wright . |
| 3,286,357 | 11/1966 | Grumman . |
| 3,421,227 | 1/1969 | Turner et al. . |
| 3,483,266 | 12/1969 | Hill . |
| 3,486,238 | 12/1969 | Hansen . |
| 3,496,565 | 2/1970 | Jenkins . |
| 3,576,124 | 4/1971 | O'Connor . |
| 3,584,387 | 6/1971 | Strum . |
| 3,633,003 | 1/1972 | Talwani . |
| 3,766,658 | 10/1973 | Shawhann . |
| 3,823,486 | 7/1974 | Bhat et al. . |
| 3,861,052 | 1/1975 | Siegfried . |
| 3,906,471 | 9/1975 | Shawhann . |
| 3,911,592 | 10/1975 | Crask . |
| 4,003,134 | 1/1977 | Adams . |
| 4,022,284 | 5/1977 | Crow . |
| 4,028,815 | 6/1977 | Buckley et al. . |
| 4,031,630 | 6/1977 | Fowler . |
| 4,077,132 | 3/1978 | Erickson . |
| 4,085,375 | 4/1978 | Galuschak et al. . |
| 4,094,073 | 6/1978 | Parra . |
| 4,097,860 | 6/1978 | Araseki et al. . |
| 4,167,818 | 9/1979 | Cantarella et al. . |
| 4,347,730 | 9/1982 | Fisher et al. . |
| 4,377,912 | 3/1983 | Hakhverdian . |
| 4,445,279 | 5/1984 | Tsushima et al. . |
| 4,486,844 | 12/1984 | Brunson et al. . |
| 4,503,622 | 3/1985 | Swartz et al. . |
| 4,567,666 | 2/1986 | Neis et al. ......................... 73/1 E |
| 4,590,680 | 5/1986 | Hanchett et al. . |
| 4,606,132 | 8/1986 | Briney et al. . |
| 4,636,960 | 1/1987 | McMurtry . |
| 4,641,434 | 2/1987 | Engler . |
| 4,642,555 | 2/1987 | Swartz et al. . |
| 4,664,662 | 2/1987 | Anderson et al. . |
| 4,878,297 | 11/1989 | Vories . |
| 4,912,662 | 3/1990 | Butler et al. ......................... 364/559 |
| 4,942,668 | 7/1990 | Franklin ......................... 33/366 |
| 5,229,957 | 7/1993 | Hahn et al. ......................... 364/571.01 X |

FOREIGN PATENT DOCUMENTS

| | | |
|---|---|---|
| 0035340 | 9/1981 | European Pat. Off. . |
| 0194087 | 9/1986 | European Pat. Off. . |
| 0221016 | 5/1987 | European Pat. Off. . |
| 0291507 | 7/1987 | European Pat. Off. . |

Primary Examiner—Kevin J. Teska
Assistant Examiner—Edward J. Pipala
Attorney, Agent, or Firm—Fliesler, Dubb, Meyer & Lovejoy

[57] ABSTRACT

An inclinometer 300 includes a sensing unit 302 for providing a signal dependent on the orientation of the inclinometer 300. The inclinometer 300 includes a rescaling unit 322 which improves the performance of the inclinometer providing additional compensation for any change in the sensor 302 over time and temperature. The inclinometer 300 further includes an angle offset function 91, 360 which provides a permanent angle offset to any angle determined by the inclinometer.

4 Claims, 16 Drawing Sheets

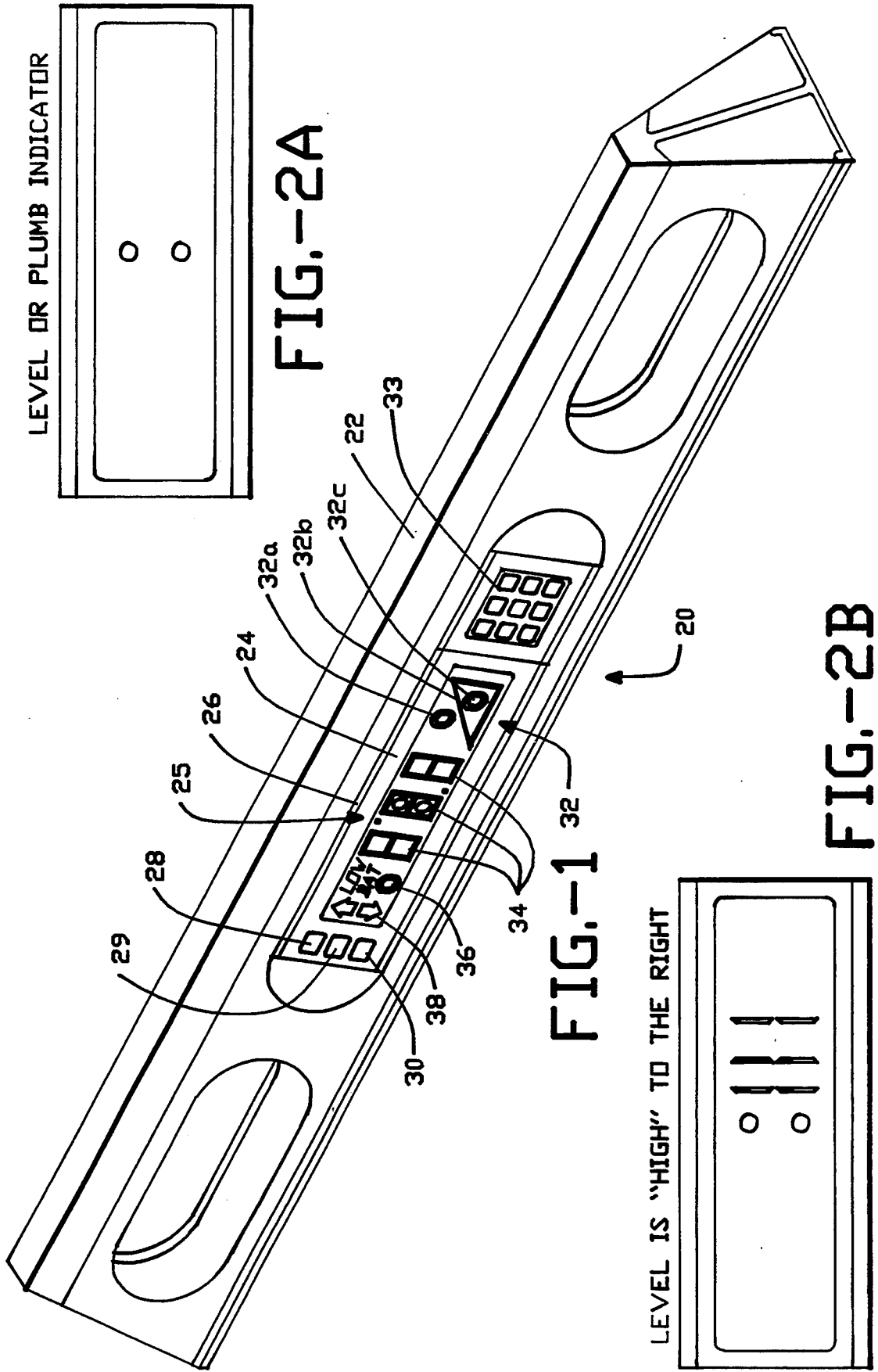

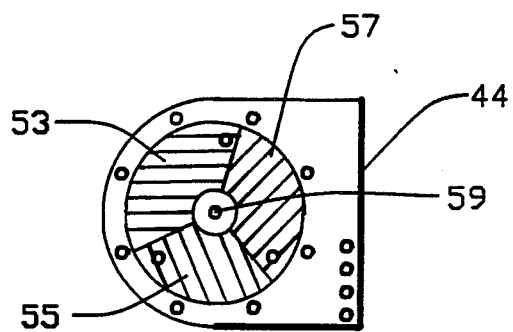
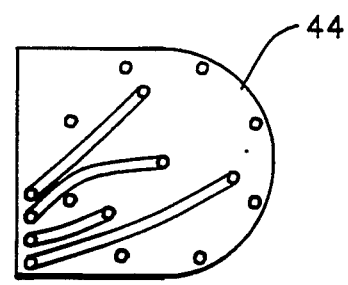
FIG.-6  FIG.-7
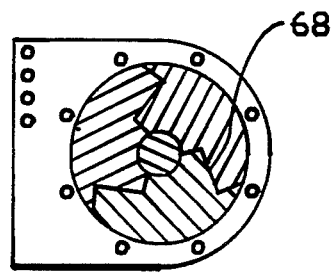
FIG.-8
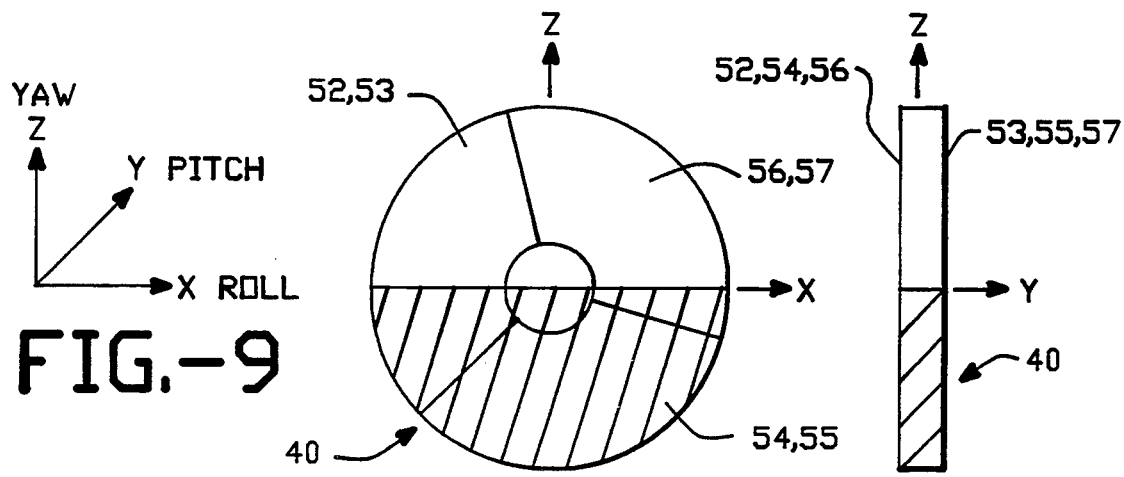
FIG.-9  FIG.-10A  FIG.-10B

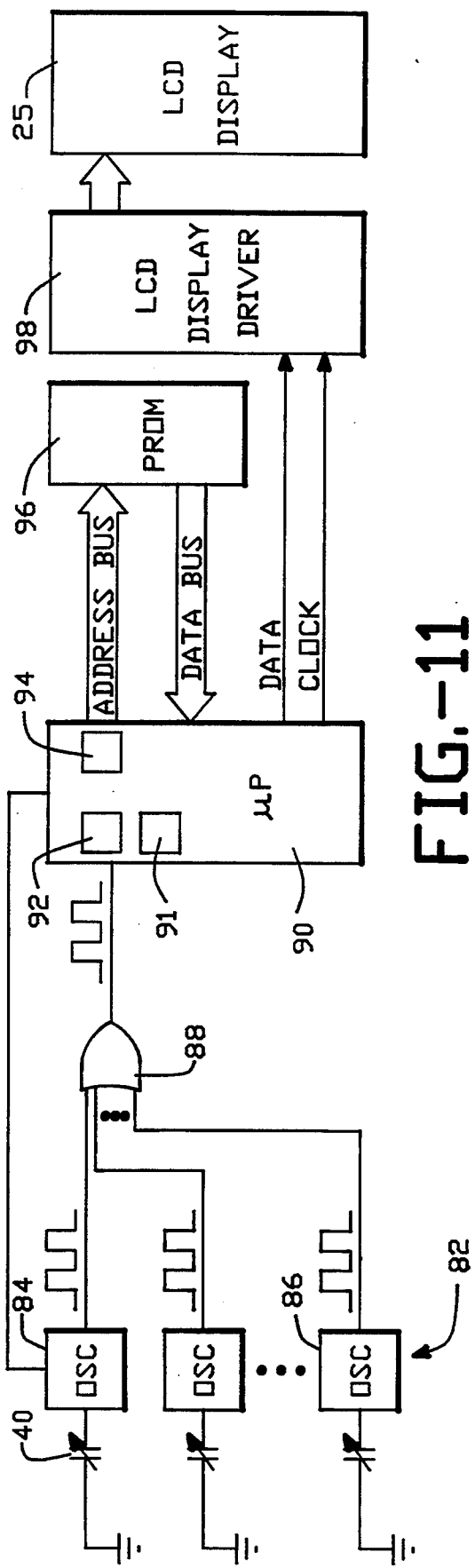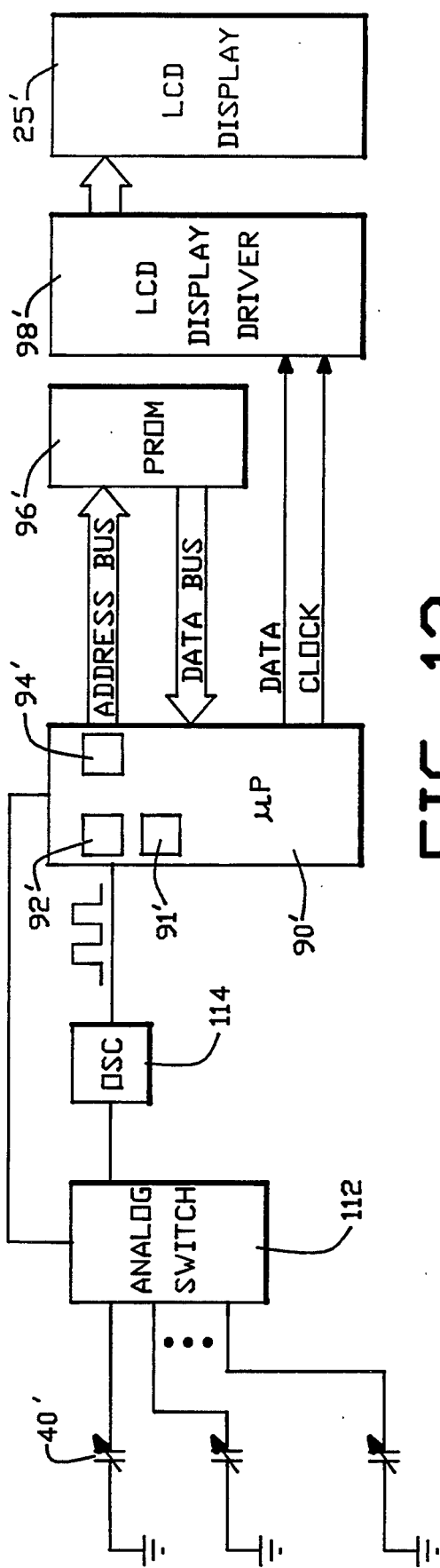

FIG.-21
IDENTIFICATION OF LEVEL ANGLES (0° AND 180°)
FIG.-21A  FIG.-21B
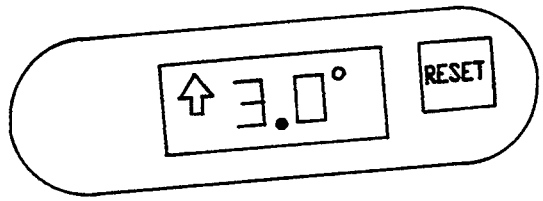 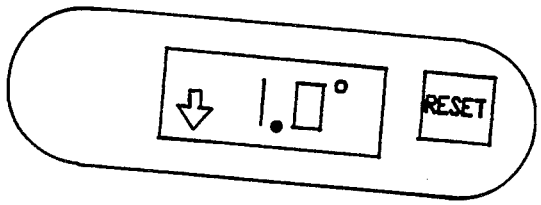
HORIZONTAL
ANGLE A = 3.0°          ANGLE B = 1.0°
ADJ 0° = (3.0° + 1.0°)/2 = 2.0°
FIG.-21C  FIG.-21D
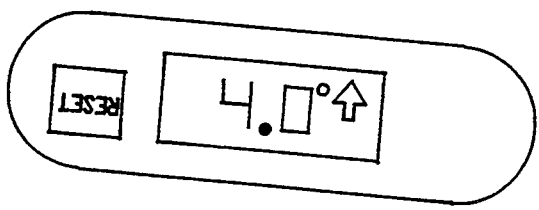 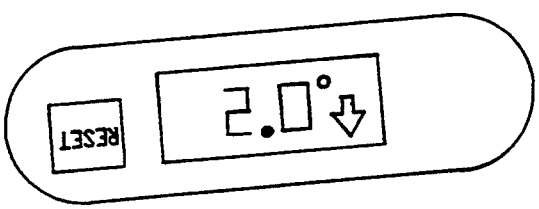
HORIZONTAL
ANGLE C = 180° + 4° = 184°          ANGLE D = 180° - 2° = 178°
ADJ 180° = (184° + 178°)/2 = 181°

FIG.-21
INDENTIFICATION OF PLUMB ANGLES (90° AND 270°)
FIG.-21E    FIG.-21F
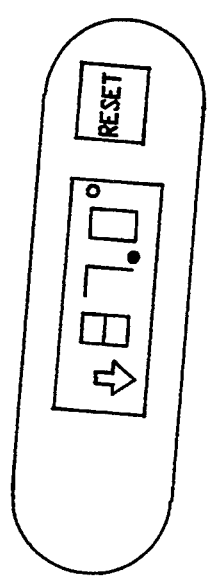
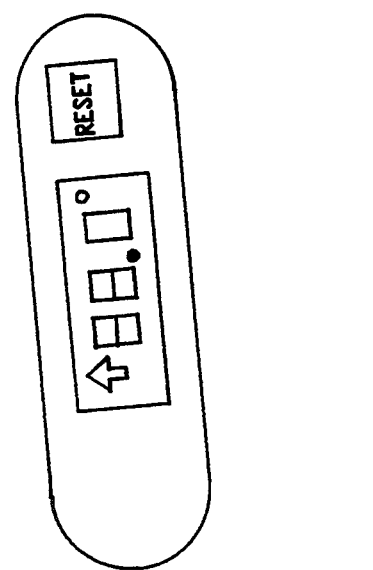
ANGLE E=360°-86°=273°   ANGLE F=180°+88°=268°
ADJ 270°= (273°+ 268°)/2 = 270.5°
FIG.-21G    FIG.-21H
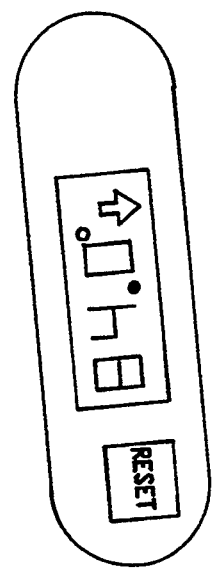
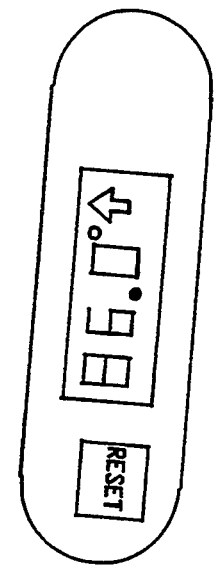
ANGLE G = 84°   ANGLE H=180°- 86°=94°
ADJ 90°= (84°+94°)/2 = 89°

EXAMPLE OF REMAPPING

INCLINOMETER WHICH IS RESCALABLE THROUGH THE USE OF MULTIPLE ANGLES

CROSS-REFERENCE TO RELATED APPLICATION

The present application is a continuation of Ser. No. 07/422,515, filed on Oct. 17, 1989 which is a continuation-in-part of U.S. Patent application entitled "INCLINOMETER", filed on Jun. 22, 1987, Ser. No. 07/065,286, now U.S. Pat. No. 4,912,662; such application was owned-at the time of invention and is currently owned by the same assignee as the present application.

FIELD OF THE INVENTION

The present invention relates to an inclinometer or level and, in particular, to an inclinometer or level with electronic sensing and readout capabilities.

BACKGROUND OF THE INVENTION

Currently there are a number of electronic inclinometer and level devices disclosed in the prior art. The simpler of these devices in general attempt to apply an electrical circuit to a known device, such as a bubble level, and therefrom directly provide a readout of the orientation of the level. Complicated inclinometers tend to take the same approach but are more bulky and cumbersome to use. In general these prior art inclinometers are difficult to manufacture due to alignment constraints and tolerances required to accurately position the sensing device into the housing. Errors in the manufacture of the sensing device and in the mounting of the sensing device in the housing can only be remedied through a practice of discarding faulty sensors and/or manufacturing the entire inclinometer with very exacting and costly procedures. Further, should the inclinometer not be rugged enough, ordinary field use would require that the inclinometer either be discarded when it provides inaccurate readings or sent back to the manufacturer for recalibration.

Finally, most inclinometers provide for only one or two readout formats requiring additional use of tables and the like for translation into other desired readings.

SUMMARY OF THE INVENTION

The present invention is directed to overcome the disadvantages of the prior art.

The present inclinometer of the invention is comprised of a sensor for providing at least a varying capacitance depending on the orientation of the inclinometer. The inclinometer further includes an oscillator circuit which includes the sensor as a capacitor element for providing a signal or a plurality of signals depending on the capacitance of the sensor. A look-up table or other mechanism is provided for storing a relationship between each signal and an angle of orientation of the inclinometer. A comparing unit is provided for comparing the signal to a value stored in the look-up table or other mechanism which has a relationship to the angle being measured. Further, a display device is provided for giving selectable digital and analog readouts. The digital readouts can include by way of example angle, rise/run, and percent slope mode readouts.

The present inclinometer includes a rescaling mechanism for rescaling the relationships between sensed and displayed angles in order to correct any variations which might occur during use of the inclinometer in the field. This rescaling mechanism can be used in the factory after this inclinometer has been manufactured and also in the field, on the job. The rescaling mechanism includes a mechanism for averaging pairs of equal but opposite angles generated by the sensor about reference angles. Rescaling is then accomplished between adjacent selected reference angles.

In the present invention, the preferred reference angles include the plumb and level angles.

A further aspect of the invention includes a method for rescaling an inclinometer including the steps of identifying a plurality of reference angles and remaping a relationship between sensed and displayed angles in accordance with the identified reference angles.

A further aspect of the present invention includes an inclinometer and method for offsetting an angle measured by the inclinometer by the offset value of a base angle. This aspect of the invention includes a device for storing a first and a second equal base angle values and a device for averaging the first and second base angle value. Further a device is provided for subtracting the average base angle from the angle determined by the inclinometer in order to present a display which results from a combination of measured angle and the base angle.

Accordingly, it is an object of the present invention to provide a mechanism and method for rescaling the relationship between a sensed and displayed angle which is stored in the inclinometer in order to account for any variations in measurements which might be experienced in the field.

Further, it is an object of the present invention to provide for the ability to display the results of the combination of a measured angle and a constant desired offset angle.

BRIEF DESCRIPTION OF THE FIGURES

FIG. 1 is a perspective view of an embodiment of the inclinometer of the invention.

FIGS. 2A through 2C are front views of the analog display of the inclinometer of the invention.

FIG. 4 through 7 are front and back views of sensor plates of an embodiment of the invention.

FIG. 8 is a side view of an alternate embodiment of a sensor plate of the invention.

FIG. 9, 10A, 10B show how the sensor can be orientated.

FIG. 11 depicts a representative schematic of a preferred embodiment of the electrical circuitry of the inclinometer.

FIG. 12 depicts another preferred embodiment of the circuitry of the inclinometer of the invention.

FIGS. 21A, 21B, 21C, 21D, 21E, 21F, 21G, 21H represent a specific example of the rescaling method of the invention.

FIGS. 24A and 24B depict error graphs of an inclinometer of the invention before and after rescaling has been accomplished.

DETAILED DESCRIPTION OF THE PREFERRED EMBODIMENTS

Figure 2C:
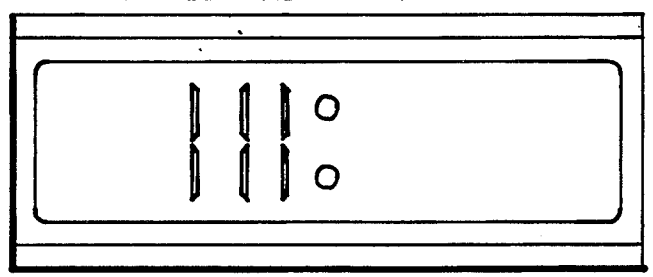

With respect to the Figures, and in particular to FIG. 1, a preferred embodiment of the inclinometer is depicted and identified by the number 20. The inclinometer 20 includes one of a number of different length rails such as rail 22 into which is removably inserted an electronic measurement unit 24 which has an outer housing 26. The face of the electronic measuring unit 24 includes a mode selector 28, a recalibration (reset) selector 29, and an accuracy range selector 30. The face further includes a combination degree, percentage and rise/run indicator 32, three seven element alphanumeric indicators 34, a low battery indicator 36 and direction indicator 38 which indicates which direction the inclinometer 20 should be moved in order to obtain a level or plumb reading. As will be more fully discussed hereinbelow, the mode selector 28 allows the selection of the display modes which can selectively provide digital displays such as the angle, the rise/run, the percent slope, and also an analog display. The analog display as shown in FIGS. 2A through 2C includes a level indicator as shown in FIG. 2A which comprises two dots. In 2B, the indicator includes three vertical lines located to the right of the dot indicating the right side is high. FIG. 2C indicates that the left side is high. The degree that either side is high is indicated by the number of lines to the right or left of the two dots. Thus, three lines to the right of the two dots indicates that the level is higher to the right side than the level would be if only one line were displayed.

Figure 3:
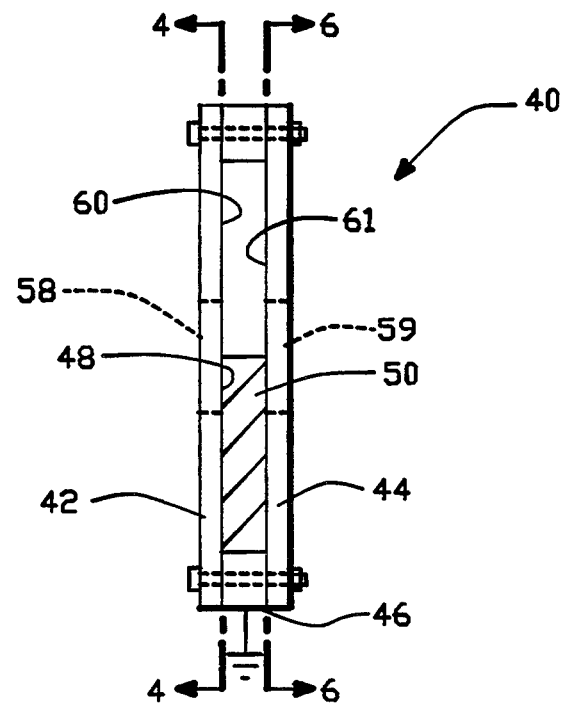
FIG. 3 is a sectional view of the sensor of the inclinometer of the invention.
Figure 4:
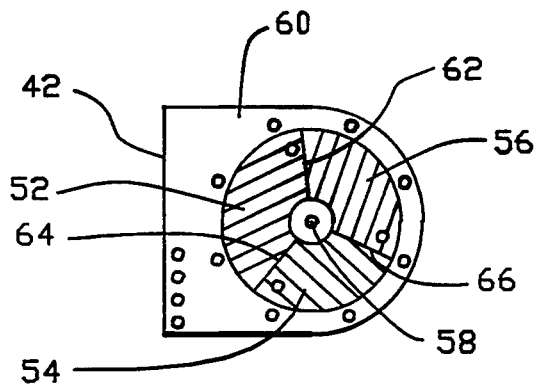

The inclinometer 20 includes a sensor unit (sensor means) 40 (FIG. 3) which senses the inclination of the inclinometer 20 through a full 360 degrees. The sensor 40 consists of two plates 42, 44. The sensor further includes a peripheral edge 46 (conducting means) which hold the plates in a spaced parallel relationship to each other and which defines an internal cavity 48. The peripheral edge 46 is conductive and grounded (FIG. 3). Inside and partially filling the cavity is a fluid 50. In a preferred embodiment the plates 42, 44, are divided into three conductive but electrically isolated sectors, or triads, such as wedge shaped sectors 52, 54 and 56 (FIG. 4). These sectors describe an outer circle and are clustered about a central isolated and conducting hub 58. In a preferred embodiment, the sensor plate and the sectors 52, 54 and 56, and hub 58 are coated with a thin layer 60 of a dielectric material such as, for example, Teflon and the fluid 50 is conductive.

Plate 44 also has three isolated and electrically conducting sectors 53, 55, and 57 and an isolated and electrically conducting hub 59 coated with a thin layer 61 of dielectric material. Sectors 52, 54 and 56 and hub 58 are parallel to and aligned with sector 53, 55 and 57 and hub 59 respectively to form variable capacitors between each sector or hub and the electrically grounded fluid 50. Thus capacitive values are measured between each sector and the peripheral edge and between each hub and the peripheral edge. Accordingly a capacitive value is associated with each sector and each hub. The look-up table disclosed herein contains appropriate relationships between each such capacitive value and the angle displayed as the orientation of the inclinometer.

It is to be understood that hubs 58, 59 can be eliminated from sensor 40 and still have sensor 70 fall within the scope of the invention.

Figure 5:
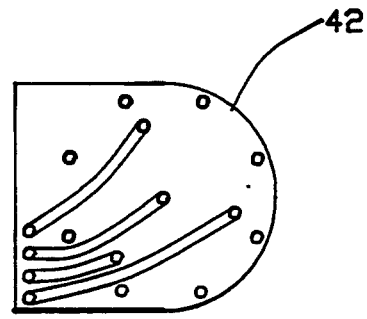

As can be seen in FIG. 5 appropriate leads (connecting means) are directed from the back of the plate 42. In the preferred embodiment, the conductive fluid 50 fills half of the cavity so that fifty percent of the area is covered with conductive fluid at any one time. The conductive fluid and the peripheral edge 46 are appropriately grounded. The plates 42, 44 are constructed, in a preferred embodiment, of fiberglass reinforce circuit board material with the edge 46 being made of aluminum. The fluids in a preferred embodiment is a combination of an alkane and a ketone.

It is to be understood that the sensor 40 can also be constructed by having the cavity 48 filled with a dielectric fluid and removing the dielectric layer from plates. The advantage of the initial design using a conductive fluid is that the conductive fluid, in effect, reduces the distance between the pairs of capacitive plates to the thickness of the teflon layer 60, 61, thus allowing a high capacitance sensor 40 to be constructed without the manufacturing problems of placing the plates 42, 44 close to each other.

A further advantage having the plates 42, 44 placed close to each other is that inaccuracies introduced because of roll and yaw are reduced as the capillary effect of the fluid causes the surface of the fluid to rotate With the sensor such that both plates 42, 44 are covered with substantially the same amount of fluid (FIGS. 9, 10A, 10D).

With the above arrangement, as the sensor unit 40 is moved through rotation, the amount of surface area of the fluid which comes in proximity to the various pairs of sectors varies making the sectors variable capacitors. Thus the sensor unit 40 allows for an economical, continuous, sensor output through 360 degrees of rotation.

To achieve continuous sensor output at all angles of inclination, the sensor design requires that the fluid intersect no more than one sensor plate separation line, such as line 62, 64, and 66 (FIG. 4) at any given angle of orientation of the inclinometer. Accordingly, it is highly advantageous that only an odd number of sectors be included in the design of the sensor unit 40. Alternatively, the sectors can have nonlinear plate separations as is shown at 68 in FIG. 8. Further there is a high degree of resolution since the electrical circuitry described below allows for the selection of the one pair of adjacent sectors for measuring the capacitance and determining angle which always has a capacitance reading which is not less than 25 percent of the total capacitance of the given pair of sectors.

A more preferred embodiment of the sensor 40 includes plate such as plates 42 and 44 that are rotated by about sixty degrees with respect to each other. Thus the sectors of each plate are rotated about sixty degrees with respect to each other.

Each of the variable capacitors formed between the sectors and hubs and the electrically grounded peripheral edge 46, form passive capacitive elements in an oscillator circuit such as the oscillator circuitry 82 (circuit means) in FIG. 11. Circuitry 82 in one of the preferred embodiments includes first oscillator 84 which is connected to the variable capacitance defined by sector 52 with the other oscillators so communicating with the other sectors and with the final two oscillators, connected to the hub. The output of each of these oscillators are periodic waves such as square waves which are communicated by OR gate 88 to a microprocessor 90. The frequency and period of the oscillator circuit is thus related to the area that a given sector has in contact with a fluid and thus the angle of inclination or pitch of the inclinometer. The period is determined by timing a fixed number of pulses from the given oscillator. In the microprocessor 90 there is a unit 92 determining means for determining the period and/or frequency of the signals coming from the oscillator circuitry 82 and a unit 94 (comparing means) for comparing the determined period with a look-up table contained in PROM 96. During manufacture, each of the sensor units 40 is calibrated and the calibration is stored in the PROM 96 (look-up table means) which is part of the electrical measuring unit 24. Thus, any irregularities in the sensor can be accounted for so that the sensor irregularities do not cause errors in the readings which are taken with the inclinometer 20. The PROM 96 stores a look-up table which relates the period of a signal to the pitch angle in degrees. Of course it is understood that other mathematical relationships can be stored so that the appropriate display is created such as the slope, rise to run or analog displays. The microprocessor then drives a display driver 98 which in turns drives the display 25.

Figure 13A:
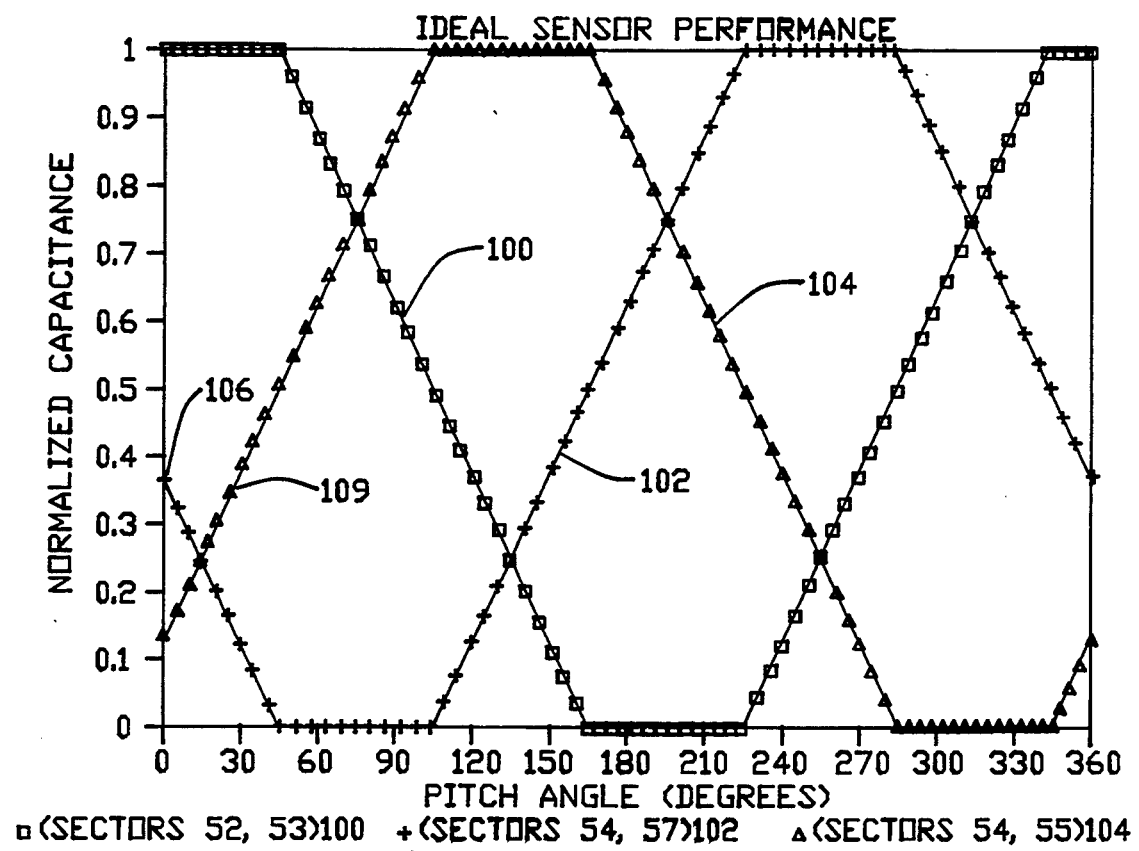
FIG. 13A and 13B show ideal and actual sensor performance.
Figure 13B:
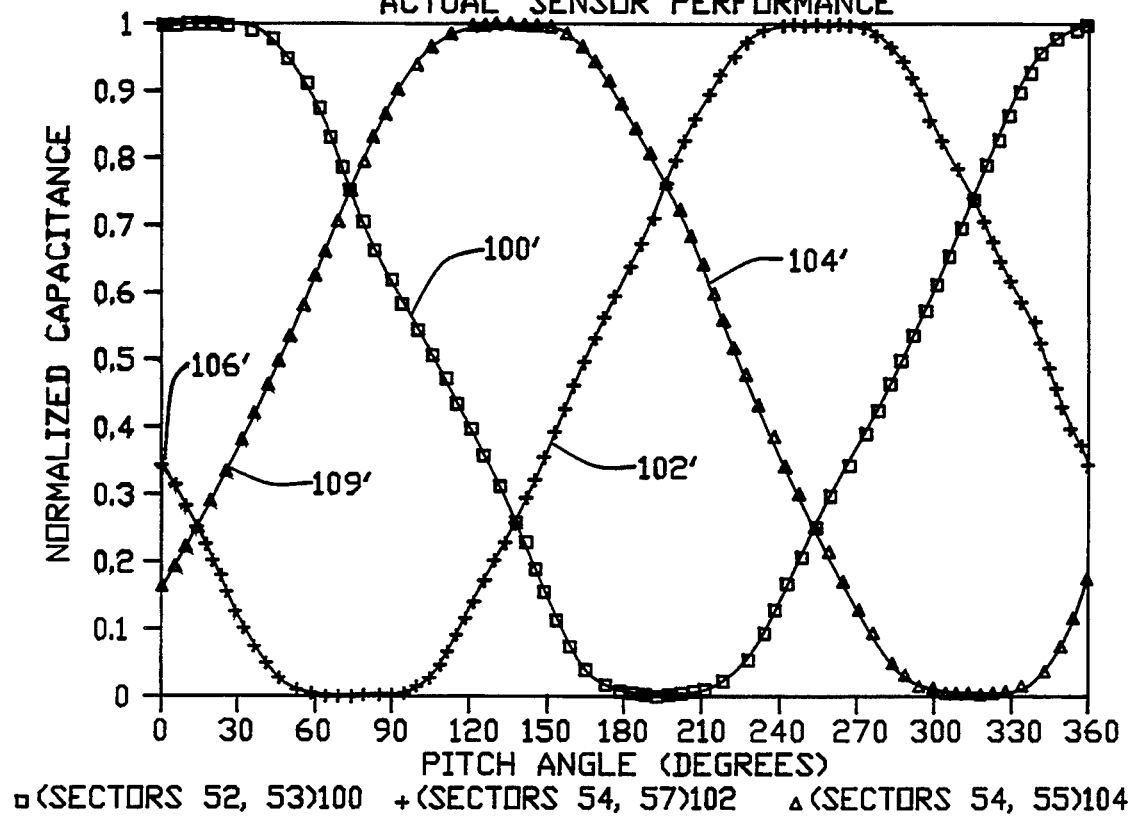

As indicated above, having the individual period versus angle relationship stored in the PROM 96 for each sensor allows the sensors to vary due to manufacturing tolerances and still have the readings accurate as the irregularities of each sensor are compensated for by the stored look-up table. Another distinct advantage of the inclinometer is that due to the look-up table it can easily accommodate sensors with nonlinear responses as long as the responses are continuous and repeatable. As depicted in FIG. 13A and 13B, the performance of the actual sensors vary from that of any ideal sensor. This difference is due to the variation in, for example, dielectric thickness, alignment of the sensor plates, chemical impurities in the fluid conductor, irregularities in the plates, volumetric variations of fluid and surface imperfections in the coatings.

In FIGS. 13A and 13B lines 100, 102 and 104 correspond respectively to sector pair 52, 53, sector pair 56, 57 and sector pair 54, 55. That is to say, for example, that the capacitance value between sector 52 and ground and sector 53 and ground are summed to produce line 100. Thus, correlating FIG. 10A, 10B, with FIGS. 13A and 13B, it can be seen that at point 106, line 100 is fully saturated giving the highest capacitance reading, line 104 represents the lowest capacitance reading as the sector pair 54, 55 has the least fluid positioned therebetween, and line 102 gives the middle capacitance reading which is the reading used for determining the actual angle as will be discussed hereinbelow. Corresponding curves in FIG. 13B are numbered with corresponding prime numbers.

As another example of how an angle is determined it is to be assumed that the inclinometer is pitched to an angle of 30 degrees. It is also to be assumed that the readings has been normalized and temperature compensated so as to behave like the ideal graphs of FIG. 13A. Thus, selecting point 109, it is determined from FIG. 13A that sector pair 52, 53, line 100, has a normalized capacitance of 1.0, sector pair 56 57 line 102 has a normalized capacitance of 0.125, and sector pair 54, 55, line 104 has a capacitance of 0.375. For simplicity sector pair 52, 53, sector pair 56, 57, and sector pair 54, 55 shall be referred to as pair 1, 2, and 3 respectively. Thus the ordering of the pair from the highest to the lowest capacitance value would be 1, 3, 2. This order uniquely identifies the sextant in which the inclinometer resides. The sextant is one of six 60 degree ranges of pitch. The six non-overlapping sextants can be arranged in the combinations of: 123, 132, 213, 231, 312, and 321. In the 360 degrees of possible pitch angle the sextant of our example is the range from 15 degrees to 75 degrees. It has been found empirically that the most linear readings occur when a sector pairs reading is between that of the other two pairs. A sector pair is associated with two given sextants, and that sector pair is used to determine the angle. Using this criterion, sector pair 54, 55, line 104, is the optimal pair for readings in this example. The microprocessor would use the sextant value (in this case pair 1, highest value, or pair 2, lowest value) to determine which one of six curves in the look-up tables to use. It would then use the pair 3 reading (capacitance=0.375) to find the angle in the look-up table, interpolating between points in the look-up table, if necessary. It is to be understood that as line 102 is relatively close to line 104 at this angle value, line 104 could also be used to determine the angle with the appropriate algorithm. Further as previously indicated when the lines 100, 102 and 104 cross the value of either line at the crossing point can be used to determine the angle.

FIG. 12 depicts another preferred embodiment of the circuitry of the inclinometer 20 with component similar to the circuitry of FIG. 11 having corresponding primed numbers. In FIG. 12 the oscillator circuitry 110 includes an analog multiplexing switch 112 which allows the various signals from the capacitor elements to be selectively switched into an oscillator circuit 114 and therefrom directed to the microprocessor 90' in much the same manner as found in the circuitry of FIG. 11. One great advantage of the circuitry of FIGS. 11 and 12 is that there is a interface between the microprocessor 90 and the sensor unit 40, which does not include an analog to digital converter.

The block diagrams of FIGS. 14 through 17 further describe the invention. In block diagram FIG. 14, block 116 determines the mode by the appropriate selection from mode switch 28. The selections are offered by blocks 120 through 126 and include an angle mode, rise/run mode, percent slope mode and analog display mode respectively. Prior to selecting any of the modes, the user can determine the accuracy range by using button 30. Button 30 is associated with blocks 128 and 130. In the preferred embodiment there are a number of accuracy ranges which are determined by the number of places past the decimal point at which the measurements of the period are adjusted by rounding off, truncating and the like.

The recalibration mode is exemplified by blocks 132 to 140 which depict the structure and means for recalibrating. It is to be understood that this recalibration can be accomplished in the field at any time by inclinometer 20 through the use of microprocessor 90, the sensor 40 and the look-up table in PROM 96 and the recalibration unit 91. Blocks 321 to 140 represent the structure of recalibration unit 91. Reasons for recalibrating the inclinometer would be that the electrical measurement unit 24 has been inserted into a different rail with different alignment tolerances and thus the sensor would be slightly offset from an ideal position. This offset can be actively accommodated by the recalibration mode. In the recalibration mode, block 132 indicates that the inclinometer is first positioned on a surface and the recalibration button is pressed. This stores the value of this first angle as determined by the determine angle routine of block 134 (storage means). The determine angle routine is more fully described below with respect to FIG. 15. Then the inclinometer is rotated 180 degrees and placed back on the same surface. A second angle measurement is taken and determined as indicated for blocks 136 and 138 (storage means) and the value stored by touching the recalibration button. The two stored angles are averaged together by the averaging means of block 140. In an ideal situation, the average would be zero. Any value greater than or less than zero is used as the offset correction factor (combining means of block 140) in all the other readings from the inclinometer until the inclinometer is again recalibrated.

The angle mode is determined with blocks 142 and 144. Block 142 is the determine angle routine as exemplified by the block diagram of FIG. 15 and block 144 is the display angle block. The rise/run mode 122 is determined by first using the determine angle routine of block 146 and the display routine of block 148. The display function is calculated at twelve times the tangent of the angle determined by block 146. This gives the rise to run value of inches per foot.

The percent slope determination is made at block 124 through blocks 150 and 152. In block 150 the determine angle routine is accomplished and in block 152 the displayed value is the value of the tangent of the angle times 100 to give a percent slope display.

Finally, the analog display as described hereinabove can be selected at block 126. The analog display has predetermined set points whereby above a certain inclination, one line to the right or left of the center line (two dots) is indicated. Above a yet higher value, two lines to the right or left of the center point is indicated. Still above a third higher value, three lines to the right or left of the center line of the display is indicated.

A key pad 33 is included to allow the user to modify and redefine the output provided by blocks 120, 122 and 124. Additionally other outputs can be programmed with key pad 33.

Figure 15:
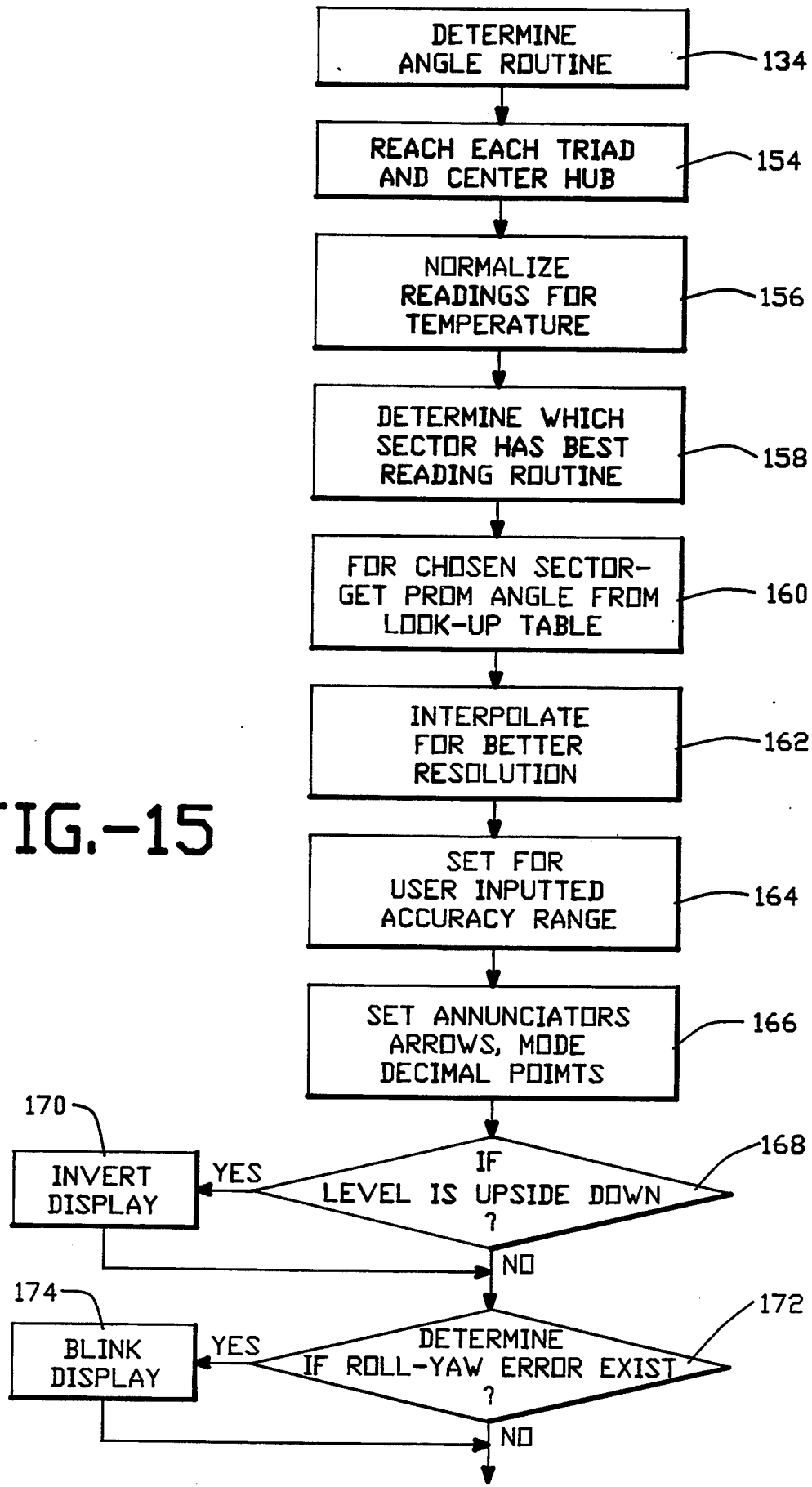
FIG. 15 is a block diagram and schematical flowchart of the methodology and structure for determining an angle.

Viewing FIG. 15, the determine angle routine is presented through blocks 154 to 174. At block 154 each of the sector pairs, and hub pair is read as previously discussed. The readings are normalized for temperature at block 156 as will be discussed hereinbelow and then the best sector for measuring the angle is determined at block 158. As previously discussed with respect to points 106, 106' and 109 and as discussed with respect to FIG. 16 the values from the sector pairs are placed in ascending order, the highest and the lowest capacitance values are excluded and the remaining sector pair is used to determine the angle because it gives the most accurate reading. Again at a cross over point where two of these capacitance values are the same, either of the two same values can be selected to determine the angle. At block 160 the angle is determined from the look-up table in the PROM. The value, if not exact, is interpolated between two close values in the look-up table and the value is rounded according to the accuracy setting in block 164. Then a determination is made as to how to energize the display at block 166 to provide the appropriate readings. At block 168, if the angle reading indicates the inclinometer is upside down, the logic of the inclinometer, as implemented in microprocessor 90 and display indicator 24, automatically inverts the display at block 170. At block 172, if the roll and/or yaw is outside of acceptable limits, the display blinks indicating to the user that the inclinometer should be repositioned.

Figure 16:
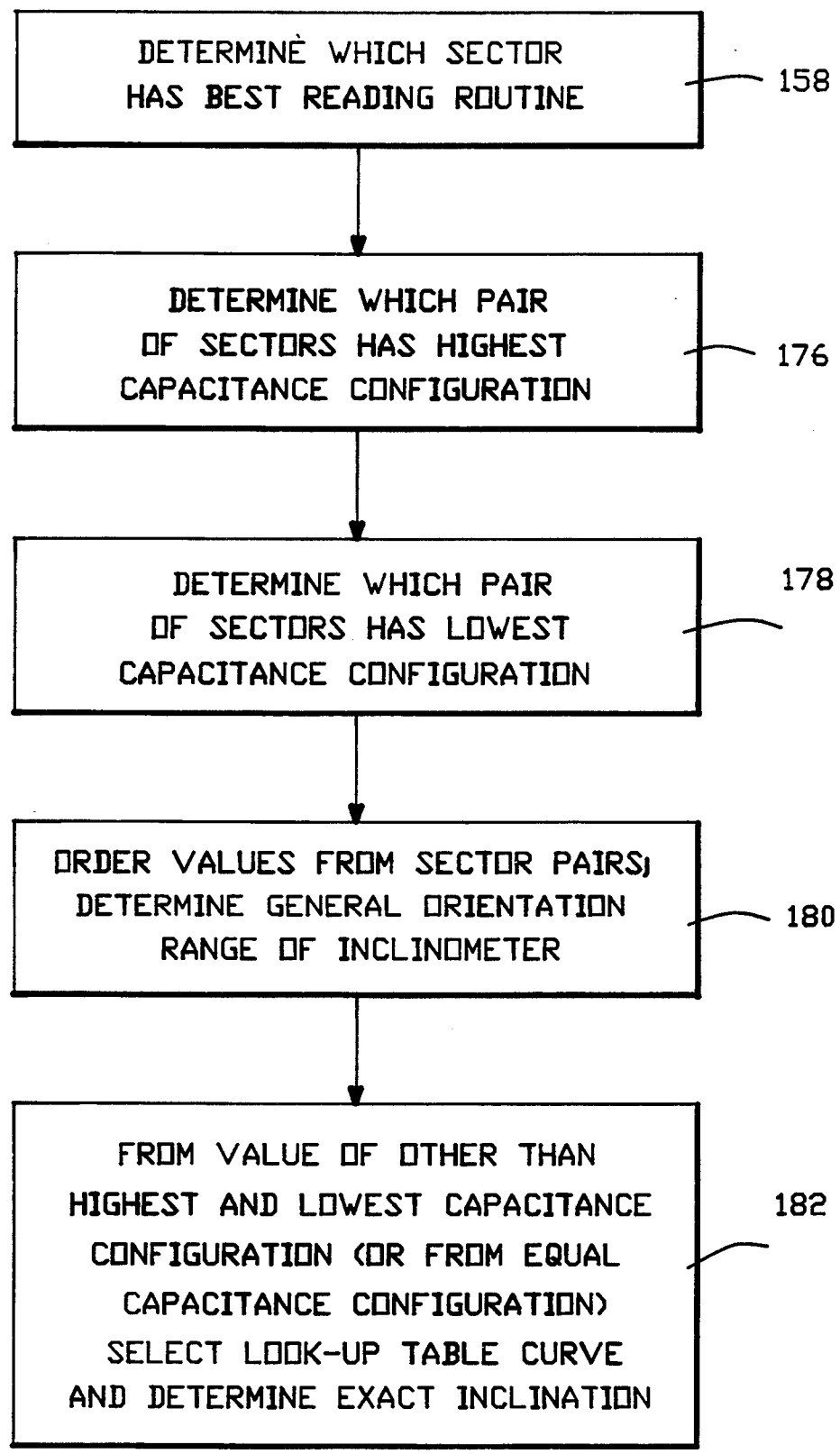
FIG. 16 is a block diagram and schematical flowchart depicting the methodology and structure for determining which sector has the best reading.

In FIG. 16, block 176 through 182 determine which sector has the best reading. This is accomplished by determining, with the microprocessor 90 and associated circuitry of inclinometer 20 (ordering means), the sector pair that has the highest capacitance (most often saturation) at block 176 and the sector pair that has the lowest capacitance at block 178. The pairs are ordered and the general orientation of the inclinometer, as previously discussed, is determined at block 180. At block 182 the sector pair which have other than the highest and lowest capacitance configuration is determined. From the value of this pair the angle is determined from the selected look-up table curve as represented in block 160. This determination allows the inclinometer to select one of the several performance curves (FIG. 13B) stored in the look-up table.

Figure 17:
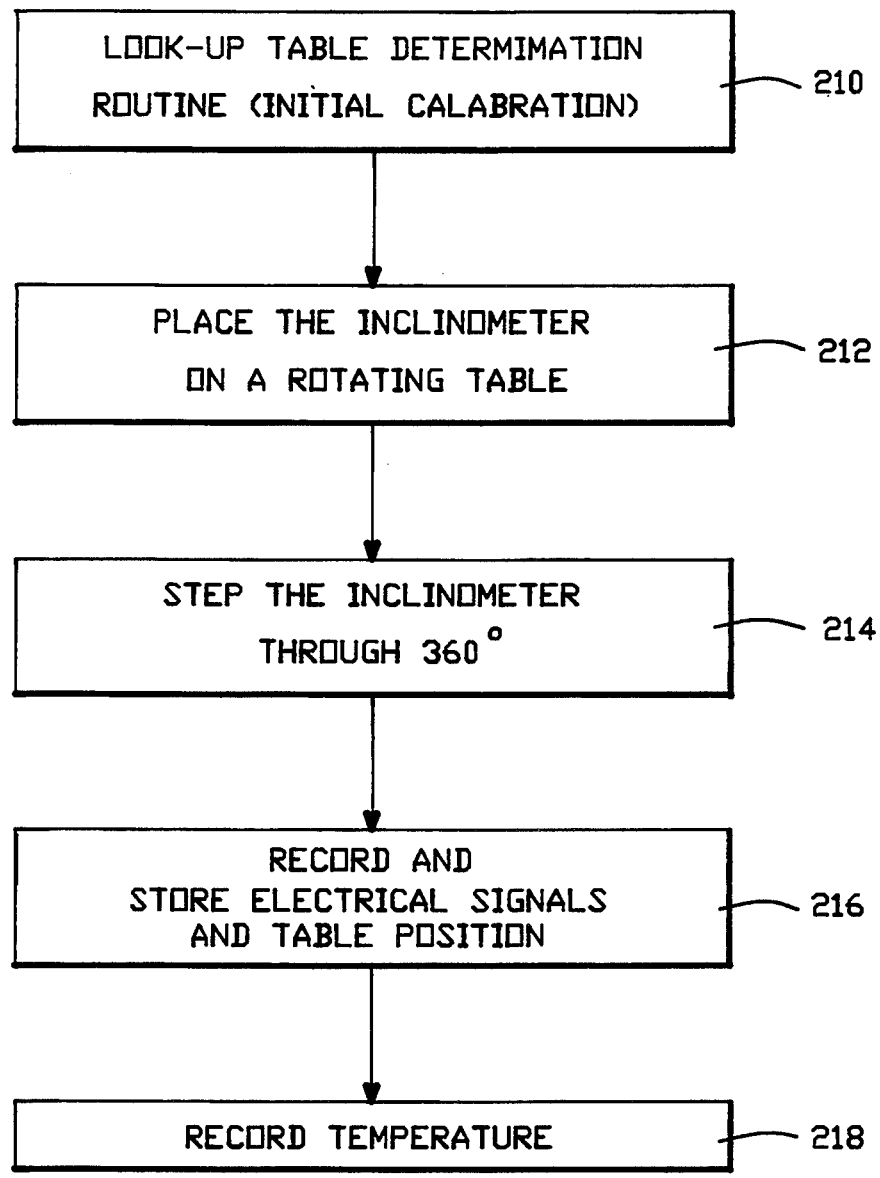
FIG. 17 is a block diagram and schematical flow chart of a methodology and structure for a look-up table determination.
Figure 18:
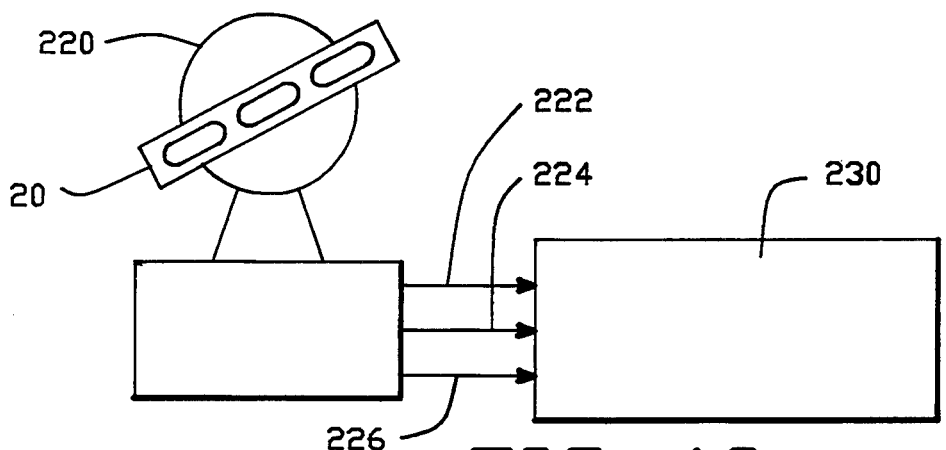
FIG. 18 is a look-up table determination structure.

A method and structure for determining the look-up table is presented in FIGS. 17 and 18. In FIG. 17 the look-up table routine is presented in blocks 210 through 218. In block 212, the inclinometer 20 is placed on a rotating table such as rotating table 220 in FIG. 18. The table is then stepped through 360° as presented in block 214. The position of the rotating table and the electrical signal indicating the angle of the inclinometer are recorded at blocks 216 in FIG. 17 and communicated by lines 222, 224 and 226 to storage unit 230 (block 216) in FIG. 18. This information can then be provided to a memory device such as the PROM 96 in FIG. 11. In the most preferred procedure the electronic measurement unit 24, itself without the rail is placed in the rotating table 220 for determining the look-up table.

The inclinometer 20 of the invention is used in the following manner. First an appropriately sized rail, whether 2, 4, 6 or 12 feet long, or of another length, is selected. Then the electrical measuring unit 26 is inserted into the rail. The unit is calibrated using the recalibration routine of block 118. Then the range accuracy is selected at selector 30 and the mode selector 28 is used to determine which mode is to be read out. The inclinometer is set in a desired location and an appropriate reading is determined.

From the above, it can be seen that the present inclinometer 20 has significant advantages with respect to ease of construction, ease of use, accuracy and reliability.

Figure 19:
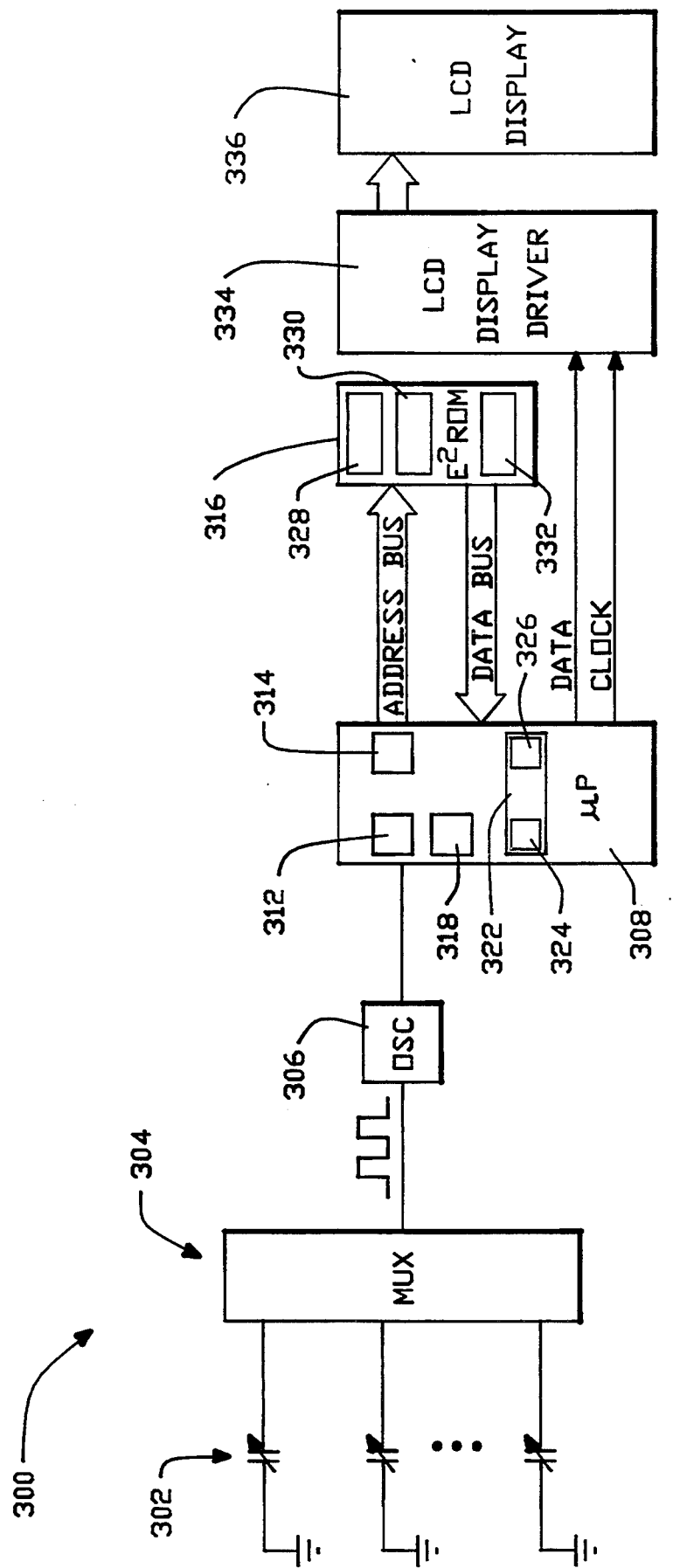
FIG. 19 is a schematic of another embodiment of the electrical circuitry of the inclinometer which depicts a rescaling mechanism.

A most preferred embodiment of the inclinometer 300 of the invention appears in FIG. 19. The inclinometer 300 includes sensors 302, analog multiplexer 304, oscillator 306 and microprocessor 308. A inclinometer sensor signal value is communicated through the analog multiplier 304 and the oscillator 306 to the microprocessor and in a particular to the determining mechanism 312 for determining the period or frequency of the signal from the oscillators 306. In this embodiment all of the capacitive values are used in order to access values stored in the look-up table.

Microprocessor 308 further includes comparing mechanism 314 for comparing data received from the sensor 302 with data stored in the main memory 316 which in a preferred embodiment includes a EEPROM. Microprocessor 308 further includes a recalibration unit 318 which operates much in the same manner as the recalibration unit 91 in FIG. 11.

Microprocessor 308 also includes a rescaling unit 322 which includes an averaging unit 324 and a scaling unit 326. The memory 316 includes a look-up table 328 for other formula or algorithm or which stores a relationship between a signal derived from the sensor 302 which is representative of the orientation of the inclinometer 300 and corresponding angle values which are displayed. Main memory 316 further includes a new data storage unit 330 and a program storage unit 332.

The inclinometer 300 further includes an LCD display driver 334 as well as an LCD display 336.

Figure 23:
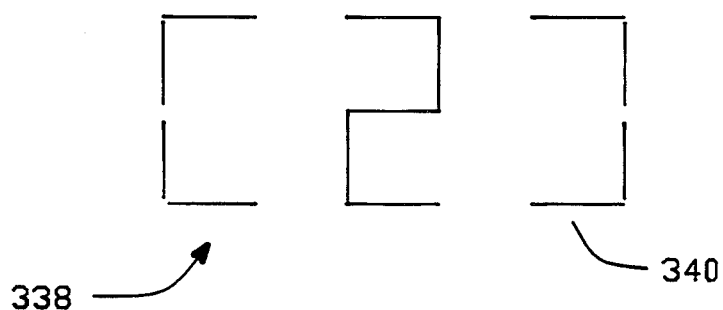
FIG. 23 depicts the prompting display generated by the embodiment of FIG. 21.

The rescaling unit 322 improves the performance of the inclinometer 300 over time by providing additional compensation for changes in the sensor over time and with temperature. In the present embodiment of inclinometer 300, the function of the rescaling unit 322 is activated by the simultaneous pushing of the mode and reset or recalibration selectors. When this occurs, the seven element alphanumeric indicators 338 switch into the display mode as is shown in FIG. 23 and acts as a prompt in order to inform the user as to which information still needs to be input in order to accomplish rescaling.

As will be described hereinbelow, four pairs of equal but opposite angles must be determined by the inclinometer 300. These four pairs are represented by the eight dashes 340 which continue to flash until the angle schematically represented by the dash is measured. The number between the eight dashes is a countdown number which shows the user how many angles still must be measured before rescaling can be accomplished.

Figure 20:
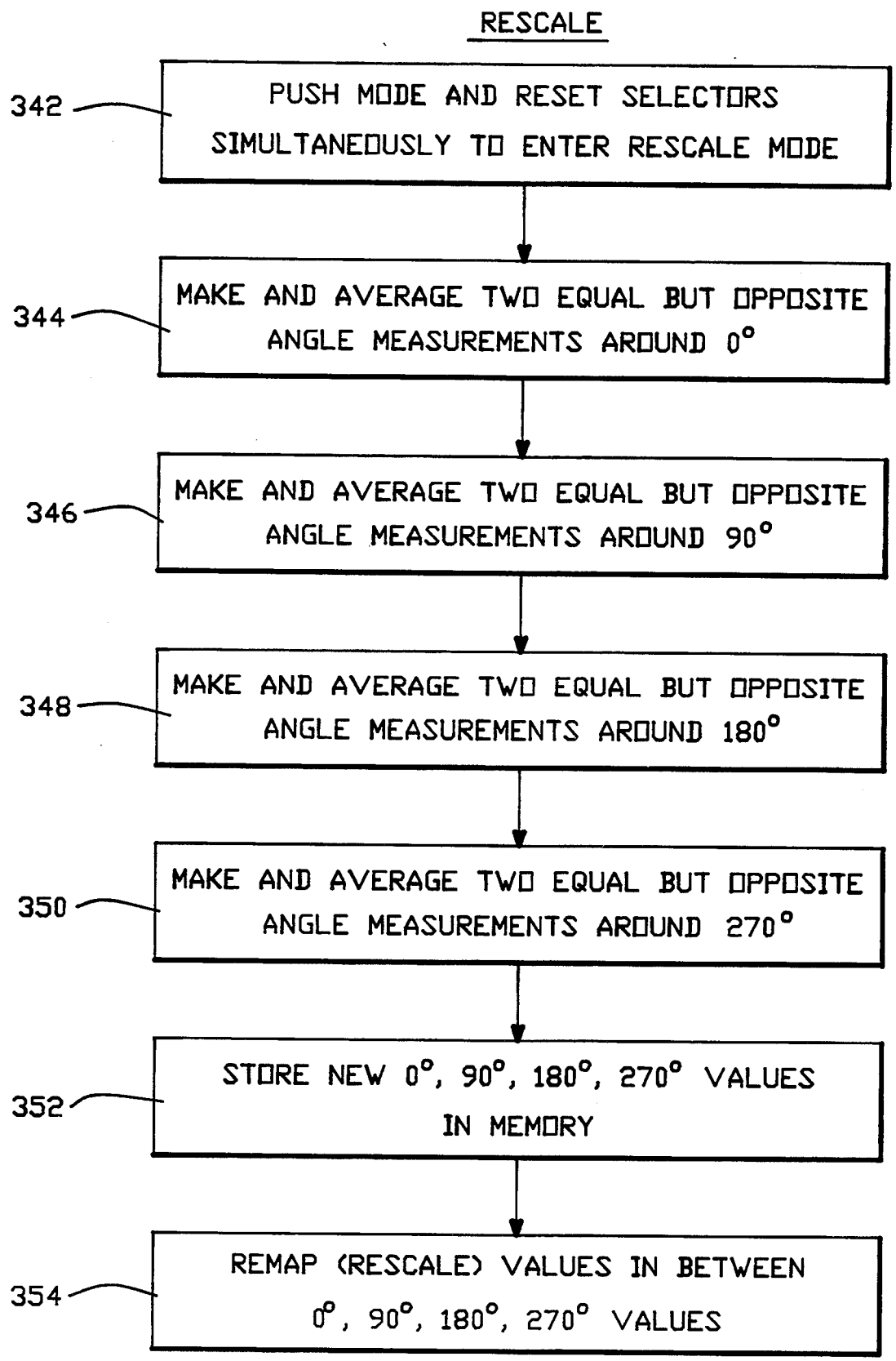
FIG. 20 is a block diagram and schematical flow chart of the methodology and structure for rescaling the look-up table.

In FIG. 20, the first block 342 depicts the above requirement that both the mode and reset selectors be pushed simultaneously to enter the rescaling mode as previously indicated. Blocks 344 to 350 indicate that equal but opposite pairs of angle measurements about reference angles must be made to store an average as data in order to accomplish the rescaling function. The reference angles in a preferred embodiment reside about plumb or vertical, and level or horizontal. These translate into angles of 0°, 90°, 180° and 270°. These angles can be permanently fixed in the rescaling unit 322 or in the program code stored in main memory 316.

FIGS. 21A, 21B, 21C, 21D, 21E, 21F, 21G and 21H depict an example of the function performed by blocks 334 through 350. In FIGS. 21A and 21B, inclinations about the horizontal at 0° are determined as specified in block 344. In the example shown, and in FIG. 21A a bottom of the inclinometer is set on a surface and a 3° measurement is taken. The inclinometer is then rotated 180° about an axis which is substantially perpendicular to the level surface and the bottom of the inclinometer is placed back on the level surface and another inclination measurement is taken. In the example shown, FIGS. 21A and 21B measure respectively 3° and 1° which translates into an adjustment angle value of 2°. This indicates that when the inclinometer is at a true reference angle of 0°, the inclinometer will determine that it is an angle of 2°. FIGS. 23C and 23D represent the determination of a pair of angles taken about a reference angle of 180° In this arrangement, the inclinometer is flipped upside down on to its top as indicated by the upside down reset button and angles are taken relative to the 180° reference angle. In FIG. 1C, an angle of 184° is determined while in FIG. 1D angle of 178° is determined. The adjustment angle value is therefore determined to be 181° which indicates that at a true reference angle of 180°, the inclinometer will determine that it is at 181°.

Figure 22:
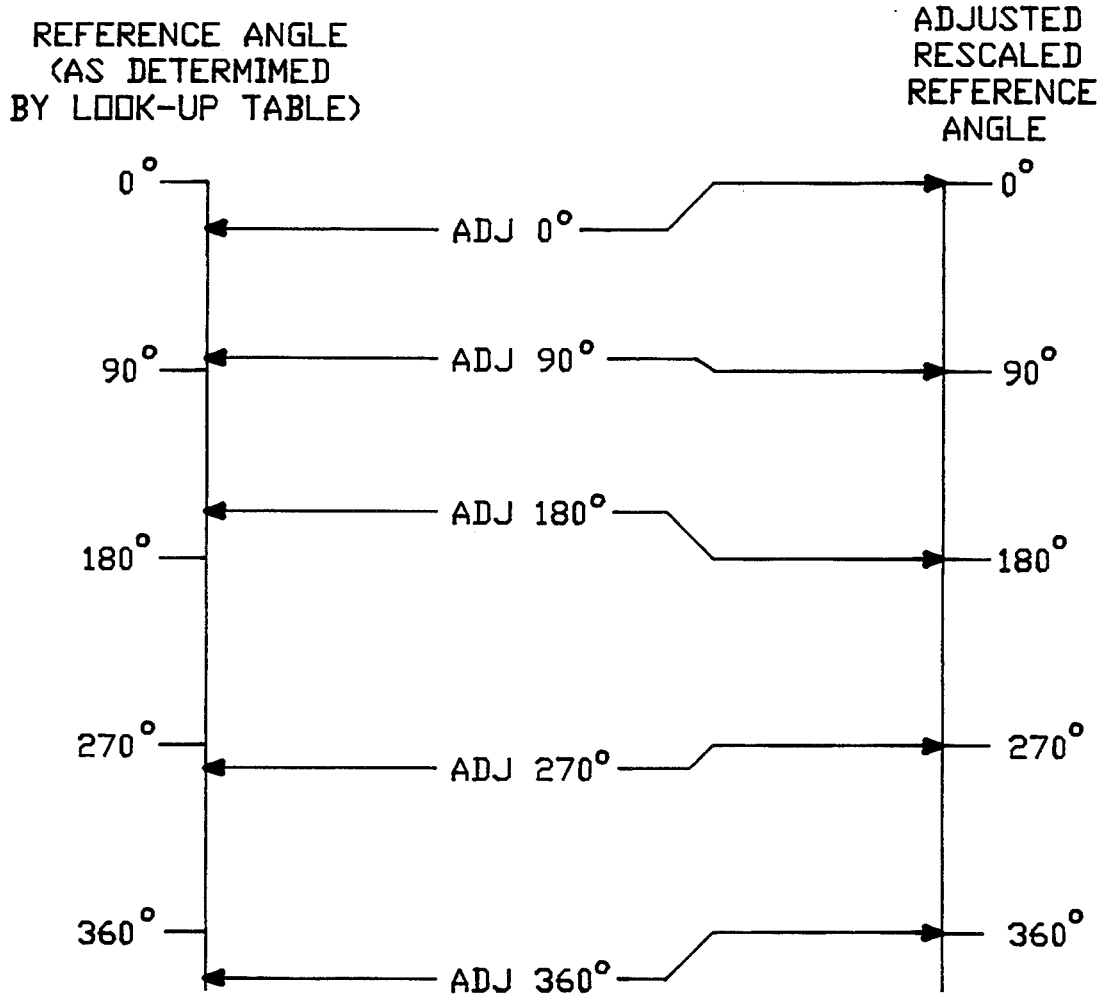
FIG. 22 depicts the results of the rescaling method.

Similarly with FIGS. 21E and 21F an adjustment angle is determined about a true reference angle of 270°. In FIG. 21E, an angle of 273° is determined while in FIG. 21F and angle of 268° is determined. The averaging of these two numbers gives an adjustment angle value of 270.5°. For this and the next plumb angle determination, the inclinometer is rotated by 180° about an angle which is substantially parallel to plumb and the longitudinal axis of the inclinometer so that a measurement is made first with the top of the inclinometer contacting the plumb surface and then with the bottom contacting the plumb surface. Further, about a 90° true reference angle, the final pair of angles is measured in FIGS. 21G and 21H. In FIG. 21G, an angle of 89° is measured while in FIG. 21H an angle of 94° is measured. As with the above pairs, the angle in FIG. 21H represents a rotation of the inclinometer by 180° about an axis perpendicular to the plane on which the measurement in FIG. 21G was determined. The adjustment angle value at the true 90° inclination is determined to be 89° These adjustment angle values are then stored in the new data store 330 of the main memory 316 and as represented in FIG. 22 are used to clearly define true reference angles of 0°, 90°, 180° and 270°. It is to be understood that in other embodiments, that other reference angles can be selected other than the above quadrant reference angles. Further, it is to be understood that other sequences can be used to collect the data represented in FIGS. 21A through 21H, and that other algorithms can be used to determined adjustment angle values. The adjustment angle values are then used to remap or scale the angles as determined by the inclinometer.

An example of the remaping or scaling function is as follows. Assuming that an angle in the first quadrant between 0° and 90° is to be determined. From the above example, the adjustment angle at 0° is 2° and the adjustment angle at 90° is 89°. Thus when the inclinometer is at a true reference angle of 0° the inclinometer will determine that it is at 2° and that when the inclinometer is at a true reference angle of 90°, the inclinometer will determined that it is at 89°. If the inclinometer is then used to measure an inclination which without the rescaling function of unit 332 would be determined to be 75°, the rescaling function rescales this angle measurement to its true angle measurement as follows. The difference of the value of 75° and the inclinometer measured reference angle of 2° is multiplied by the ratio of 90° which represents the number of degrees between the two true reference angles, and 87° which represents the difference between the angles of 2° and 89° as sensed and determined by the inclinometer to be the reference angle. Thus with the rescaling function, the inclinometer, instead of reading of 75°, would read 75.5°.

$$\text{Angle Displayed} = \frac{\text{Difference between true reference angles} \times \text{Difference between angle to be scaled and an inclinometer measured reference angle}}{\text{Difference between inclinometer measured reference angles}}$$

Accordingly:

$$\text{Angle Displayed} = \frac{(90° - 0°) \times (75° - 2°)}{(89° - 2°)}$$

After this rescaling is accomplished, the recalibration or reset correction as discussed with respect to recalibration unit 91 is applied to the angle value. This recalibration unit 91 determines an offset value which is applied to all angles between 0° and 360°.

In a preferred embodiment, the recalibration function as taught by recalibration unit 91 in FIG. 11 would be performed daily or any time that an event such as the dropping of the inclinometer occurs in order to recalibrate the inclinometer for any variations in the positioning of the sensor of the inclinometer with respect to the rail or components of the inclinometer. The rescaling function would be performed at three to six month intervals in a preferred embodiment in order to adjust for any changes to the inclinometer which would occur over time. Further, should the inclinometer be used in changed environment such as one where the average temperature is significantly higher than its prior environment, then rescaling could be used for compensating for temperature variations.

In FIG. 20, block 352 accomplishes the storing of the new angle adjustment values in the main memory and block 354 accomplishes the scaling or remaping of any desired reading or measurement of the inclinometer with respect to these new stored values.

Figure 24A:
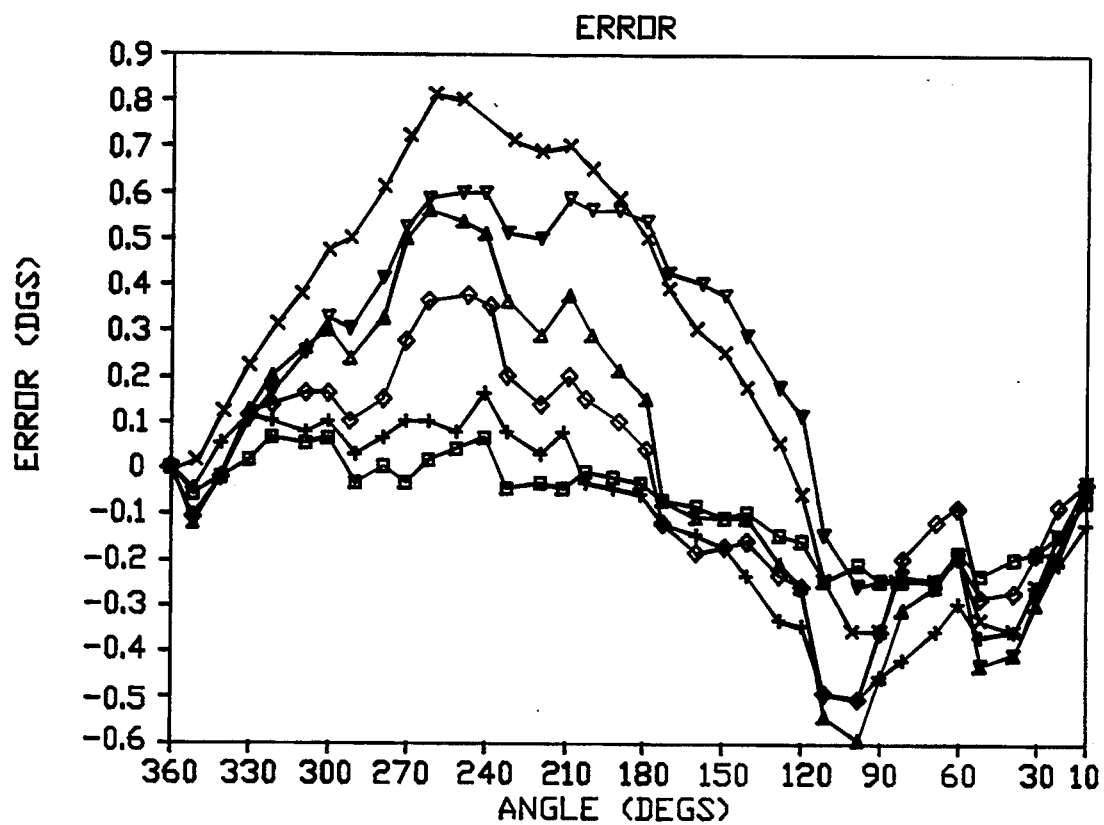
Figure 24A:
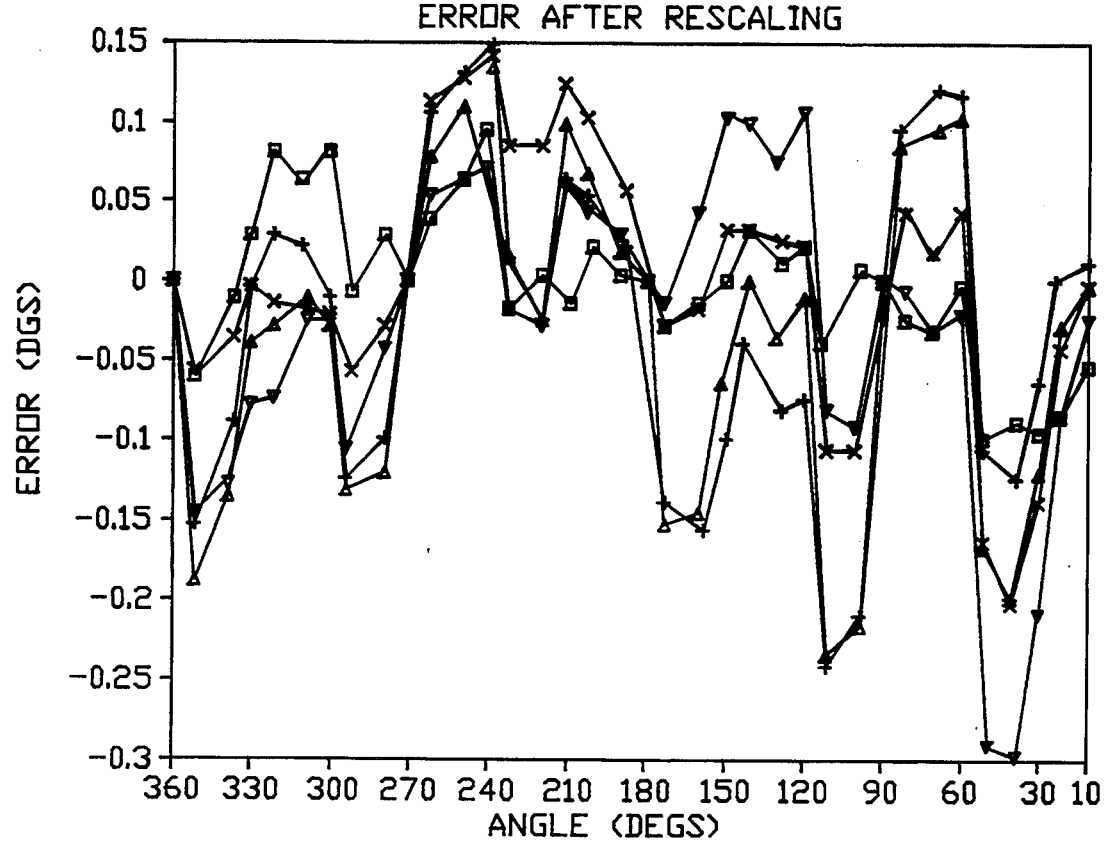

FIGS. 24A and 24B demonstrate the effect of rescaling. In FIG. 24A each plot represents a different day with their measurements taken through 360°. It is noted that in the 240° range, that for this specific sensor that there are larger errors in degree readings than, for example, in the 60° or 150° ranges. With remaping or rescaling as demonstrated by FIG. 24B at 0°, 90°, 180° and 270°, the error is brought to 0° with the errors in between these values being substantially less than the errors depicted in FIG. 26A.

It is to be understood that other algorithms, in addition to the above look-up table, can define the relationship between an inclinometer sensor signal value and a displayed inclinometer angle value and that the rescaling apparatus and method described can be used to remap the algorithms.

In another embodiment the present invention, the level would not be calibrated on a calibration table in the factory as indicated in FIG. 18. Instead, a nominal look-up table in ROM memory would be established for all inclinometers. Then before the inclinometer is shipped from the factory, a rescaling procedure as herein described would be performed in order to calibrate the inclinometer. This recalibration would lock in the plumb and level angles and give a maximum error which would be greater than the maximum error using the method as shown in FIG. 18.

In yet a further embodiment of the present invention, the determination of the inclinometer measured reference angles with respect to the true angles could be made in a more manual fashion by the user. In such an embodiment, once the inclinometer is placed in a rescaling mode by pushing both the mode and reset selector simultaneously, appropriate roll up and roll down keys on keypad 33 are pushed in order to adjust the displayed reading on the inclinometer Accordingly, inclinometer measured reference angles would be determined and stored as follows. First the inclinometer would be placed on a level surface and a measurement taken. The inclinometer could for example read plus 3°. Then the inclinometer would be rotated 180° about an axis perpendicular to the level surface and placed back on the level surface. The inclinometer could for example, read negative 5°. With these two readings, a user could, using the roll up and roll down buttons, average a displayed angle value so that the first reading is rolled up from 31° to 4° and the second reading is rolled down from −5° to −4°. This adjustment would be stored in the inclinometer EEPROM memory and be used to determine the adjustment reference angle value relative to a true 0° reference level angle. The same procedure could be used for all reference points. Once these reference values are determined, then the angled display could be rescaled according to the previously defined algorithms.

Figure 25:
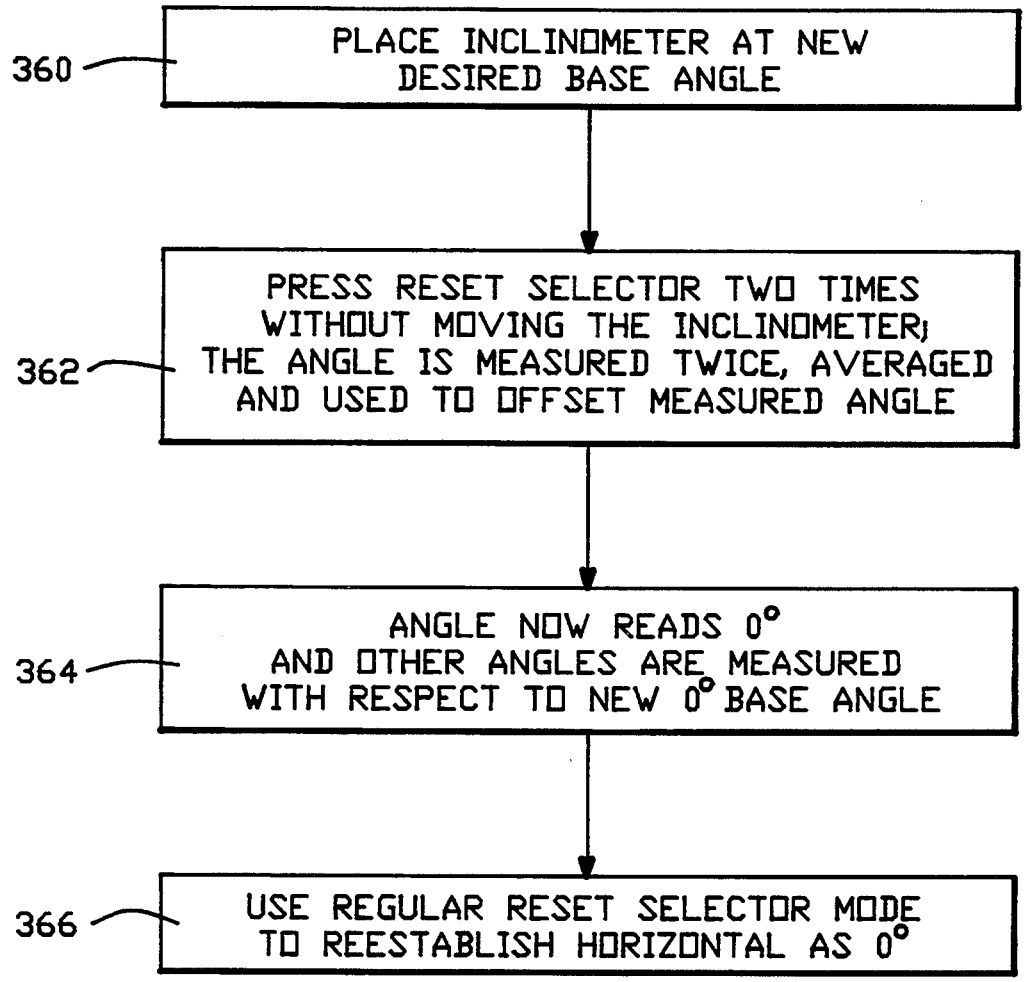
FIG. 25 depicts a block diagram and schematical flow chart of the methodology and structure providing for an angle offset capability of the invention.

Another embodiment of the invention is depicted in FIG. 25 and in particular in blocks 360, 362, 364 and 366 thereof. This embodiment is also implemented through the recalibration unit 91 as shown in FIG. 11. In this embodiment, an angle offset mode is accomplished. Should it be desired that at any particular angle the inclinometer has a 0° reading, the structure of the embodiment of FIG. 25 is utilized. Such an arrangement would be useful if for example a structure were being added to a roof which roof is at a given slope. The inclinometer would be set so that when the inclinometer is lying on the slope, a 0° reading is determined.

Figure 14:
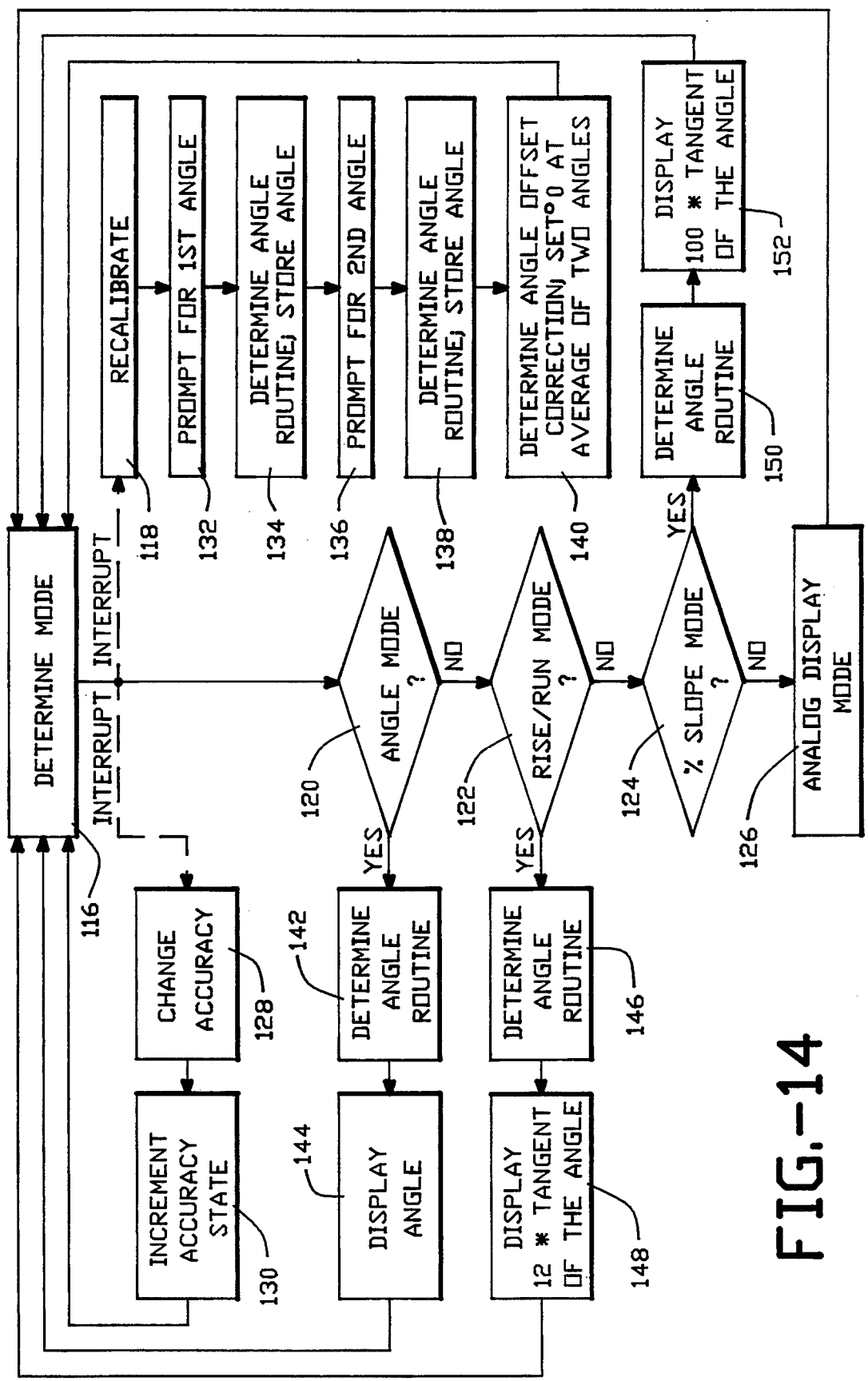
FIG. 14 is a block diagram and schematical . flowchart of the methodology and structure for selecting the various modes of an embodiment of the invention.

In order for this to accomplished, the inclinometer is placed at the new desired base angle such as, for example, 30°. The reset button is pressed two times without moving the inclinometer as indicated in block 362. At block 364, the angle as read by the inclinometer when placed on this 30° slope will be 0° as the base angle is read twice, averaged to be 30° and then subtracted from the reading of 30° to give a 0° reading. Other angles are now measured relative to 0°. Further, all angles measured by the inclinometer are offset by the base angle value of 30°. In order to have the inclinometer revert to normal operation, the regular reset or recalibration selector mode as described in FIG. 14 is utilized.

INDUSTRIAL APPLICABILITY

As can be seen from the above, the operation of the inclinometer 300 of the invention has a significant advantage in overcoming sensor variations due to time and temperature. With this embodiment at the reference values, the error is brought to 0°, with any error experienced in a measurement made between the reference values greatly reduced.

Further with another embodiment of the invention, a fixed offset value can be used as desired in order to have all measurements displayed by the inclinometer automatically offset by the predetermined value.

In addition to the advantages, aspects and objects of the invention as described hereinabove and, in particular, in the summary of the invention, other objects, aspects, and advantages of the invention can be obtained through review of the claims and the figures appended hereto. It is to be understood that although selected embodiments are presented herein, a multitude of other embodiments are possible and within the scope of the invention as claimed.

We claim:

1. A inclinometer for determining angles comprising:
   a sensor means for generating signal values representative of the orientation of the inclinometer;
   means for defining a relationship between various orientation angles of the inclinometer and the signal values that can be generated by the sensor means that are representative of the orientation angles of the inclinometer;
   means for relating each signal value generated, by the sensor means, to the relationship defining means for selecting a corresponding orientation angle;
   means for displaying the corresponding orientation angle selected by the selecting means;
   means for rescaling the relationship defining means including:
   (a) means for storing at least one pair of equal but opposite angle values generated by the sensor means about each of a plurality of reference angles;
   (b) means for averaging at least each pair of said angle values to obtain an adjustment angle value for each of the reference angles;
   (c) means for using the adjustment angle values of at least two selected reference angles to adjust the relationship between the signal values and the various orientation angles of the inclinometer;
   wherein the plurality of reference angles includes plumb and level angles;
   wherein the storing means includes means for storing plumb and level adjustment angle values for plumb and level reference angles that are adjacent to an angle for which the relationship is to be adjusted;
   wherein the using means includes:
   means for fining an adjusted angle by multiplying the difference of the angle for which the relationship is to be adjusted and one of the plumb and level adjustment angle values, by 90° divided by the difference between the plumb and level adjustment angle value; and
   means for associating the signal value associated with the angle to be adjusted, with the adjusted angle.

2. An inclinometer comprising:
   means for sensing and storing at least a pair of equal but opposite angle values about a plurality of reference angles;
   means for averaging at least each pair of angle values to obtain an adjustment angle value for each of the reference angles;
   means for using the adjustment angle values of selected reference angels to adjust an inclinometer sensor signal value associated with a measured angle of inclination;
   wherein the means for using includes:
   means for rescaling an inclinometer sensor signal value by multiplying the difference between the inclinometer sensor signal value to be rescaled and an adjustment angle value for a reference angle adjacent to the angle of inclination associated with the inclinometer sensor signal value, by a ratio of the true angular difference between the two reference angles adjacent to the angle or inclination associated with the inclinometer sensor signal value divided by the difference between the adjustment reference angle values adjacent to the angle of inclination associated with the inclinometer sensor signal value.

3. An inclinometer comprising:
   a means for rescaling the inclinometer including:
   means for determining and storing signal values corresponding to approximately level and approximately plumb reference angles;
   means for using the stored signal values corresponding to the approximately level and approximately plumb reference angles to adjust an inclinometer sensor signal value; and
   wherein the using means includes:
   means for rescaling an inclinometer sensor signal value corresponding to an angle between a level reference angle and a plumb reference angle comprising:
   means for multiplying the difference between the inclinometer sensor value to be rescaled and one of an inclinometer measured approximately level and approximately plumb reference angles by a ratio of 90° divided by the difference between the approximately level reference angle and the approximately adjacent plumb reference angle, which approximately level reference angle and approximately plumb reference angle are located on opposite sides of the angle corresponding to the inclinometer sensor signal value to be rescaled.

4. An inclinometer including:
   means for rescaling the inclinometer including:
   means for sensing and storing a plurality of reference angles; and
   means for using the reference angels to adjust an inclinometer sensor signal value;
   wherein the means for using includes:
   means for rescaling an inclinometer sensor signal value between adjacent referenced angles by multiplying the difference between the inclinometer sensor signal value to be rescaled and an adjacent inclinometer measured reference angle, by a ratio of the true angular difference between the two reference angles adjacent to the inclinometer sensor signal value to be rescaled, divided by the difference between reference angle values as measured by the inclinometer.

* * * * *

UNITED STATES PATENT AND TRADEMARK OFFICE
CERTIFICATE OF CORRECTION

PATENT NO. : 5,335,190

DATED : August 2, 1994

INVENTOR(S) : Robert E. Nagle, et al.

It is certified that error appears in the above-indentified patent and that said Letters Patent is hereby corrected as shown below:

Claim 1, Column 13, Line 4:
After "1." and before "inclinometer"
delete "A" and substitute
therefor —An—

Claim 2, Column 14, Line 8:
After "angle" and before
"inclination" delete "or" and
substitute therefor —of—

Signed and Sealed this

Twenty-second Day of November, 1994

Attest:

BRUCE LEHMAN

Attesting Officer

Commissioner of Patents and Trademarks